US012748628B2

(12) United States Patent
Djuhera et al.

(10) Patent No.: US 12,748,628 B2
(45) Date of Patent: Sep. 29, 2026

(54) DISTRIBUTED EXECUTION OF AN ARTIFICIAL INTELLIGENCE MODEL

(71) Applicant: INTERNATIONAL BUSINESS MACHINES CORPORATION, Armonk, NY (US)

(72) Inventors: Aladin Djuhera, Dachau (DE); Alecio Pedro Delazari Binotto, Munich (DE); Fernando Luiz Koch, Greenwich, CT (US); Nathalie Baracaldo Angel, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 501 days.

(21) Appl. No.: 18/449,811

(22) Filed: Aug. 15, 2023

(65) Prior Publication Data

US 2024/0419498 A1 Dec. 19, 2024

Related U.S. Application Data

(60) Provisional application No. 63/472,826, filed on Jun. 14, 2023.

(51) Int. Cl.
*G06F 9/50* (2006.01)

(52) U.S. Cl.
CPC .................................. *G06F 9/5033* (2013.01)

(58) Field of Classification Search
CPC ............. G06F 9/5033; G06F 2209/509; G06F 9/5072; G06F 9/505; G06F 9/5044; G06F 9/5055; G06F 9/5066; G06N 3/045; G06N 20/00; H04L 63/0428; H04L 47/803
See application file for complete search history.

(56) References Cited

U.S. PATENT DOCUMENTS

| | | | | |
|---|---|---|---|---|
| 11,551,121 | B2 | 1/2023 | Horesh | |
| 2019/0258937 | A1 | 8/2019 | Alemi | |
| 2020/0036512 | A1* | 1/2020 | Vaikuntanathan | H04L 63/08 |
| 2020/0382273 | A1* | 12/2020 | Vald | G06N 5/01 |

(Continued)

FOREIGN PATENT DOCUMENTS

CN 111600707 A 8/2020

OTHER PUBLICATIONS

U.S. Appl. No. 63/305,845, filed Feb. 2, 2022, Liu; Miaomiao.*

(Continued)

*Primary Examiner* — Tan Doan
(74) *Attorney, Agent, or Firm* — Eric W. Chesley

(57) ABSTRACT

The present disclosure relates to a method for executing an artificial intelligence model, including receiving an input for execution of the AI model. An input block of the AI model can be executed by a first computer system using the received input, producing a first output. The first output can be encoded. The encoded first output can be sent to a second computer system. The second computer system can decode the encoded first output. The second computer system can execute an intermediate block of the AI model using the first output, producing a second output. The second output can be encoded. The encoded second output can be sent to the first computer system. The first computer system can decode the encoded second output. The first computer system can execute an output block of the ML model using as input the second output, producing a result output.

20 Claims, 8 Drawing Sheets

(56) References Cited

U.S. PATENT DOCUMENTS

| | | | | |
|---|---|---|---|---|
| 2022/0383188 | A1* | 12/2022 | Ananthanarayanan | G06F 18/214 |
| 2024/0054404 | A1* | 2/2024 | Umezawa | G06N 5/04 |
| 2024/0154942 | A1* | 5/2024 | Gharibi | H04L 63/0428 |
| 2025/0156687 | A1* | 5/2025 | Liu | G06F 21/52 |

OTHER PUBLICATIONS

Baccour et al., "RL-DistPrivacy: Privacy-Aware Distributed Deep Inference for low latency IoT systems," arXiv:2208.13032v1 [cs. LG] Aug. 27, 2022, 20 pages.

Chamikara et al., "Privacy Preserving Distributed Machine Learning with Federated Learning," arXiv:2004.12108v2 [cs.DB] Feb. 26, 2021, 41 pages.

Chaopeng et al., "A privacy protection approach in edge-computing based on maximized dnn partition strategy with energy saving," Journal of Cloud Computing: Advances, Systems and Applications, 2023, 16 pages.

Chinchali, et al., "Neural Networks Meet Physical Networks: Distributed Inference Between Edge Devices and the Cloud," HotNets '18: proceedings of the 17th ACM Workshop on Hot Topics in Networks, Nov. 2018, pp. 50-56.

Gunarathne et al., "Poster : Distributing Deep Learning Inference on Edge Devices," Association for Computing Machinery, 2020, pp. 556-557.

Kailkhura et al., "Distributed Inference in the Presence of Eavesdroppers: A Survey," arXiv: 1502.05448v1 [cs.CR], Feb. 19, 2015, 7 pages.

Khan et al. "Split Ways: Privacy-Preserving Training of Encrypted Data Using Split Learning," arXiv:2301.08778v1 [cs.CR] Jan. 20, 2023, 9 pages.

Phan et al., "Differential Privacy Preservation for Deep Auto-Encoders: An Application of Human Behavior Prediction," Proceedings of the Thirtieth AAAI Conference on Artificial Intelligence, 2016, pp. 1309-1316.

Tuor et al., "Understanding information leakage of distributed inference with deep neural networks: overview of information theoretic approach and initial results," Proc. SPIE 10635, Ground/Air Multisensor Interoperability, Integration, and Networking for Persistent ISR IX, 106350K, May 4, 2018, printed from the internet Apr. 25, 2023, 3 pages.

Yan et al., "Privacy-Preserving Compressive Model for Enhanced Deep-Learning-based Service Provision System in Edge Computing" IEEE Access, Jul. 8, 2019, pp. 92921-92937, vol. 7.

* cited by examiner

DISTRIBUTED EXECUTION OF AN ARTIFICIAL INTELLIGENCE MODEL

PRIORITY DATA

This application claims priority to U.S. Provisional Application No. 63/472,826, filed Jun. 15, 2023, which is incorporated herein by reference.

BACKGROUND

The present disclosure relates to the field of digital computer systems, and more specifically, to a method for executing an artificial intelligence (AI) model.

A radio access network (RAN) provides access to and coordinates the management of resources across sites of a mobile telecommunication system in accordance with a protocol stack. The radio access network provides processing resources which can, for example, be used to infer AI models.

SUMMARY

Various embodiments provide a method, computer program product, and system for executing an artificial intelligence (AI) model as described by the disclosure. Advantageous embodiments are described in the dependent claims. Embodiments of the present disclosure can be freely combined with each other if they are not mutually exclusive.

In one aspect of the present disclosure are directed to a computer-implemented method for executing an artificial intelligence model, comprising an artificial intelligence model configured to receive a specific input, process the specific input and provide a specific output. The computer-implemented method comprises splitting the artificial intelligence model into an input block, an intermediate block and an output block, such that the input block receives the specific input and provides an intermediate output, the intermediate block receives as input the intermediate output and provides another intermediate output, and the output block receives as input the other intermediate output and provides the specific output.

The computer-implemented method further comprising receiving an input for execution of the artificial intelligence model and executing the input block by a first computer system using the received input, producing a first intermediate output. The computer-implemented method further comprising encoding by the first computer system the first intermediate output using a first encoding protocol and sending the encoded first intermediate output to a second computer system. The computer-implemented method further comprising, in response to receiving the encoded first intermediate output, decoding by the second computer system the encoded first intermediate output using the first encoding protocol, and executing the intermediate block by the second computer system using as input the first intermediate output, producing a second intermediate output. The computer-implemented method further comprising encoding by the second computer system the second intermediate output using a second encoding protocol and sending the encoded second intermediate output to the first computer system. The computer-implemented method further comprising, in response to receiving the encoded second intermediate output, decoding by the first computer system the encoded second intermediate output using the second encoding protocol, and executing the output block at the first computer system using as input the second intermediate output, producing a result output.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

In the following embodiments of the disclosure are explained in greater detail, by way of example only, making reference to the drawings in which.

DETAILED DESCRIPTION

Figure 1:
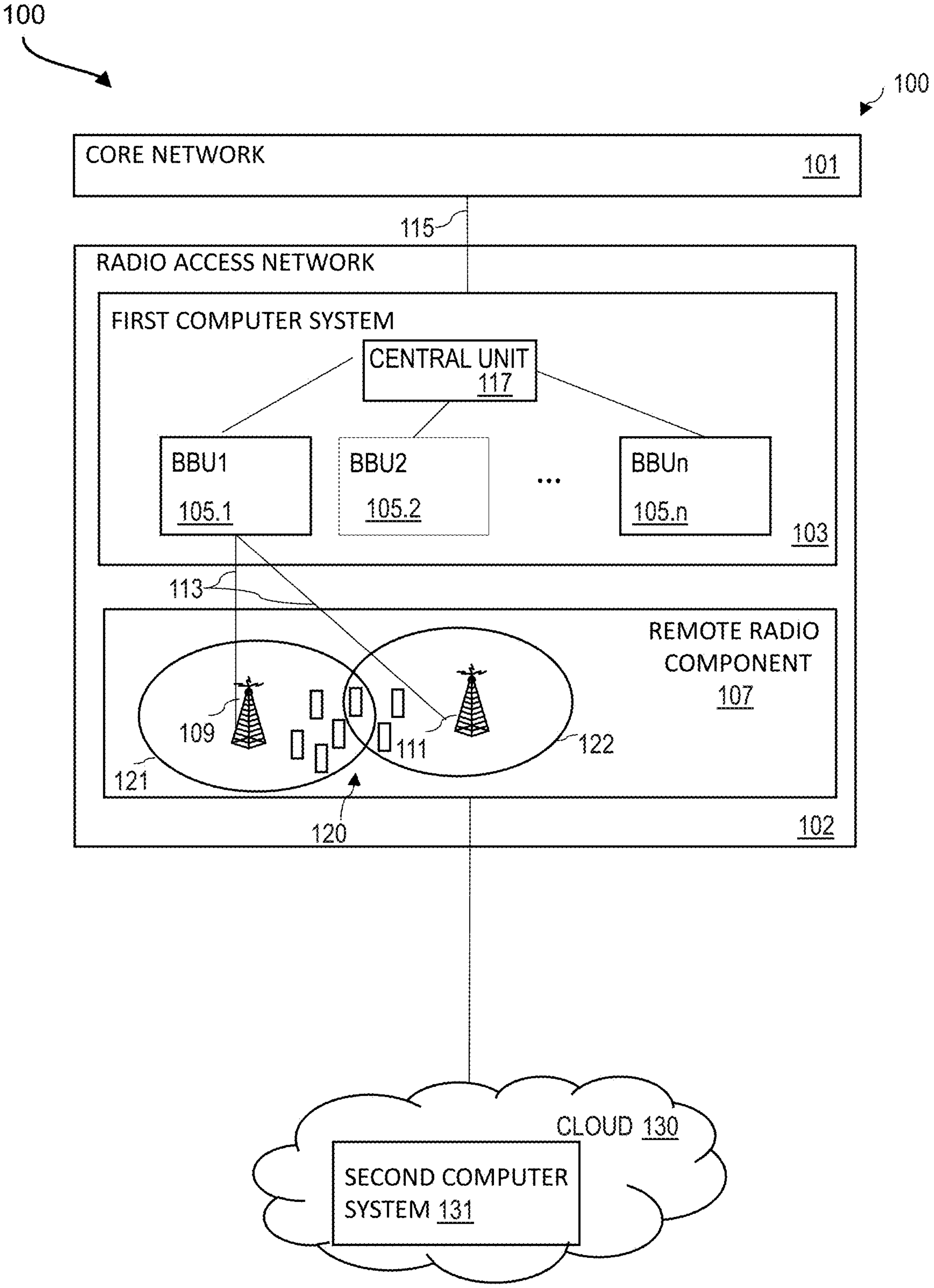
FIG. 1 is a block diagram of a wireless communication system in accordance with an example of the present disclosure.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to an aspect of the invention, there is provided a computer-implemented method for executing an artificial intelligence model. The method includes receiving an input for execution of the artificial intelligence model, where the artificial intelligence model is split into an input block, an intermediate block, and an output block, such that the input block receives specific input and provides an intermediate output, the intermediate block receives as input the intermediate output and provides another intermediate output, and the output block receives as input the another intermediate output and provides specific output. The method further includes executing the input block by a first computer system using the input, producing a first intermediate output. The method further includes encoding by the first computer system the first intermediate output using a first encoding protocol to produce an encoded first intermediate output. The method further includes sending the encoded first intermediate output to a second computer system to allow the second computer system to: decode the encoded first intermediate output using the first encoding protocol, and execute the intermediate block using as input the first intermediate output to produce a second intermediate output, encode the second intermediate output using a second encoding protocol to produce an encoded second intermediate output, and send the encoded second intermediate output to the first computer system. In response to receiving the encoded second intermediate output, the method further includes decoding by the first computer system the encoded second intermediate output using the second encoding protocol, and executing the output block at the first computer system using as input the second intermediate output, producing a result output. As a result, the method provides a technical effect of splitting an artificial intelligence model into blocks to enable efficient operation on constrained computing devices.

In some embodiments, before executing the output block, the computer-implemented method further includes deleting the input block from the first computer system, which provides a technical effect of improving resource usage of the first computer system.

In some embodiments, after executing the input block, the computer-implemented method further includes deploying the output block into the first computer system, which provides a technical effect of distributing a task to computing devices that have resources to perform the task.

In some embodiments, the splitting of the artificial intelligence model is performed based on available resources in the first computer system, which provides a technical effect of adjusting operations to cope with variations of computing resource availability on constrained computing devices.

In some embodiments, the splitting of the artificial intelligence model is dynamically performed or performed using one of predefined splitting options which are associated with a respective amount of resources. As a result, the method provides a technical effect of providing an up-to-date structure of the blocks based on currently available resources.

In some embodiments, the execution of the artificial intelligence model includes execution of a succession of processing steps, where splitting the artificial intelligence model is performed such that the input block is configured to perform a first number of successive processing steps, the intermediate block is configured to perform a second number of successive processing steps that follow the first number of successive processing steps of the input block, and the output block is configured to perform a third number of last successive processing steps, where a sum of the first number of successive processing steps, the second number of successive processing steps, and the third number of last successive processing steps is a total number of processing steps in the artificial intelligence model. As a result, the method provides a technical effect of splitting an artificial intelligence model to perform successive processing steps efficiently and effectively.

In some embodiments, the first number of successive processing steps is smaller than the second number of successive processing steps by a first delta value, where the third number of last successive processing steps is smaller than the second number of successive processing steps by a second delta value. As a result, the method provides a technical effect of systematic and equal processing of the artificial intelligence model on available resources.

In some embodiments, the first and second delta values are determined based on available resources in the first computer system, which provides a technical effect of making the execution of the artificial intelligence model more secure by performing more of the processing steps locally.

In some embodiments, the first encoding protocol is the second encoding protocol, which provides the technical effect of uniform processing and communication of data between the first and second computer systems while still securing and/or reducing communicated data.

In some embodiments, the first encoding protocol is different from the second encoding protocol, which provides the technical effect of securing the blocks using multiple encoding protocols to decrease the risk of unauthorized access to encoded data.

In some embodiments, the first encoding protocol is selected from a group consisting of compression and encryption, and wherein the second encoding protocol is selected from a group consisting of compression and encryption. As a result, the method provides a technical effect of enabling secure communication of data and reducing network usage.

In some embodiments, the execution of the artificial intelligence model is an inference of the artificial intelligence model which is already trained, which provides a technical effect of reducing resources of constrained computing devices that would otherwise be used to train the artificial intelligence model.

In some embodiments, for each further received input, the method trains the artificial intelligence model, where the first computer system is further configured to compute in each iteration a loss function and to send a result to the second computer system, where the result is used by the first and second computer systems to update learnable parameters of the artificial intelligence model, where an iteration is performed until the loss function fulfils a convergence criterion. As a result, the method provides a technical effect of updating the parameters of the artificial intelligence model to better perform a task.

In some embodiments, the first computer system has an amount of processing resources which is smaller than the processing resources of the second computer system, which provides a technical effect of efficiently utilizing network resources when the first computer system is a constrained computing device.

In some embodiments, the first computer system is selected from a group consisting of an edge device and an internet of things (IoT) device, which provides the technical effect of utilizing constrained resources to execute the artificial intelligence model.

In some embodiments, the second computer system is provided as a service in a cloud environment, which provides the technical effect of mitigating external model inversion and/or reverse-engineering attacks by withholding the complete artificial intelligence model from the service.

In some embodiments, the artificial intelligence model is a foundation model. Namely, the artificial intelligence model is a deep neural network where the input block represents first network layers, the intermediate block represents middle network layers, and the output block represents last network layers. As a result, the method provides a technical effect of splitting the artificial intelligence model based on the network layers of the deep neural network model.

In some embodiments, the artificial intelligence model is split by a management server, where the management server deploys the input block, the output block, and the intermediate block in the first and second computer systems. As a result, the method provides a technical effect of using the management server to distribute the blocks to the first and second computer systems to ensure maximum utilization of hardware resources.

According to another aspect of the invention, there is provided a system for executing an artificial intelligence model. The system performs the method operations described above. According to yet another aspect of the invention, there is provided a computer program product for executing an artificial intelligence model. The computer program product performs the method operations described above.

An artificial intelligence (AI) model can be configured to perform a task. The task may refer to a type of prediction or inference being made. The task can be based on the problem or question that is being asked, and the available data. The task can, for example, be a classification task, clustering task, or a prediction task. For example, the classification task assigns data to categories, and the clustering task groups data according to similarity. The AI model can perform the task by receiving input data. processing the input data using a set of learnable parameters, and providing an output that represents the result of the task.

The execution of the AI model can be performed in accordance with an execution pipeline. The execution pipeline can comprise three or more sequential execution stages, where each execution stage is configured to receive an input, process the input using a subset of the learnable parameters, and provide an output. The input of one execution stage, which is not the first execution stage, can be the output of the preceding execution stage. The input block can represent one or more first execution stages of the pipeline, the output block can represent one or more last execution stages of the pipeline and the intermediate block can represent the remaining execution stages. For example, in a case of a deep neural network an execution stage can represent the processing of one or more layers of the deep neural network. The processing performed for one network layer can, for example, comprise weighting operations, convolution operations, or activation operations etc. The AI model can be split at two cut layers, and the intermediate output can, for example, comprise cut layer activations. In general, the present model splitting can be applied for various AI architectures such as convolutional neural networks (CNNs) or other AI architectures such as Transformers, Resnet, long short-term memory (LSTM) networks, or an AI model that can be executed in accordance with an execution pipeline as described above.

In one splitting example, the splitting of an AI model can comprise the step of determining or identifying the execution pipeline. In one example, the execution pipeline can be provided in association with the AI model (e.g., the execution pipeline can be predefined in a metadata file in association with the AI model). In this case, the metadata file can be read in order to extract the execution pipeline. Alternatively, the execution pipeline can be automatically determined using (e.g., parsing and interpreting) the code that implements the AI model. In this first splitting example, the splitting can further comprise the steps of assigning the execution stages of the determined execution pipeline to the three blocks. In one example, the assignment can be done randomly. This can be advantageous in case the first computer system has enough resources to even run the whole AI model. In another example, the assignment can be performed based on available resources in the first computer system and resources required for the executions stages of the pipeline. For example, the metadata file can further comprise an estimation of processing resources required by each execution stage of the pipeline. Alternatively, the processing resources required by each execution stage can be estimated using, for example, the number of code lines and types of commands used in each execution stage.

In another splitting example, the splitting of the AI model can comprise splitting the code that executes the AI model into the three blocks based on the programming language being used. This can be performed by parsing and interpreting the code. The number of code lines and types of commands can indicate the resources required by each block.

However, the execution of the AI model can be vulnerable to adversarial attacks and manipulations that can compromise the data being processed and produced by the AI model. The present disclosure enables a secure execution of the AI model by executing the most vulnerable blocks of the AI model at a local computer system. In addition, the communication of intermediate results can be secured by using specific encoding protocols.

The encoding protocol can define a method of encoding of original data to obtain encoded data and define a corresponding method of decoding that restores the original data from the encoded data. The encoding of data can include any one of: encrypting, compressing, ciphering, formatting, or the assignment or interpretation of specific bit patterns to the data. This can secure communication of data. Alternatively, or additionally, this can ensure efficient utilization of network resources (e.g., because compression can reduce the data size). For example, in case the encoding is performed by compressing the output, the decoding of the compressed output is performed by decompressing the compressed output. In case the encoding is performed by encrypting the output, the decoding of the encrypted output is performed by decrypting the encrypted output.

A first computer system can be a local computer system (e.g., accessible to users). A second computer system may not be part of the first computer system. The second computer system may be remote from the first computer system. The first computer system can be configured to connect to the second computer system by any form or medium of wireline and/or wireless digital data communication, (e.g., a communication network). Examples of communication networks include a local area network (LAN), a radio access network (RAN), a metropolitan area network (MAN), a wide area network (WAN), Worldwide Interoperability for Microwave Access (WIMAX), a wireless local area network (WLAN), all or a portion of the Internet, and/or any other communication system or systems at one or more locations.

The present disclosure can have the following advantages. The present disclosure can introduce applicable data-preserving operations for AI models to operate efficiently on constrained computing devices. The present disclosure can ensure optimal transmitted data sizes to ensure efficient utilization of network resources. The present disclosure can adjust the data preservation operations to cope with the variations of computing resource availability on constrained computing devices. The present disclosure can dynamically schedule model split ratios for AI models to distribute the inferencing task across constrained first computer systems (e.g., edge computing devices) and second computer systems (e.g., cloud server instances). The present disclosure can introduce security for distributed inference using large and complex AI models (e.g., Foundation Models) which can be processed efficiently on constrained computing environments, such as Edge computing and Internet of Things (IoT) devices. The present disclosure can prevent issues such as model inversion attacks by malicious parties as well as reverse engineering attempts of sensitive input data and/or output labels by either malicious parties and/or honest-but-curious servers (e.g., in the cloud).

According to some examples, before executing the input block, the input block can be deleted from the first computer system. For example, a management server can distribute the input block, the intermediate block and the output block to the first computer system and second computer system, respectively, while ensuring that the first computer system can only process either the input block or output block at each time instance to ensure maximum utilization of hardware resources, (e.g., the input block configuration can be deleted after execution), the encoding and the transmission to free up computational power for the output block. The management server can, for example, be configured to connect to the first and second computer systems and control operations of the first and second computer systems.

According to one example, after executing the input block, the output block can be deployed into the first computer system. For example, the output block can be downloaded from the management server after execution of the input block. This can further improve the resource usage of the first computer system because processing resources for maintaining the output block can be saved while the output block is not being used.

According to some examples, after executing the input block, the input block can be deleted and the output block can be deployed into the first computer system. For example, the output block can be downloaded from the management server after execution of the input block. This can further improve the resource usage of the first computer system because only one block can be processed and managed at a time by the first computer system.

According to some examples, the splitting of the AI model is performed based on available processing resources in the first computer system. The processing resources can be selected from the group consisting of central processing unit (CPU) resources, storage resources, and memory resources. A trade-off between the secure execution of the AI model and the available processing resources can be performed. The larger the input block the more secure the execution of the model is. This is because a high number of processing stages in the input block can render unpredictable output of the input block.

According to some examples, the splitting of the AI model is dynamically performed (e.g., determined on "the fly") or performed using predefined splitting options which are associated with respective amounts of resources. For example, the dynamic splitting can be performed by providing the individual blocks based on their computational complexity in accordance with the available resources on the first computer system. The dynamic splitting can, for example, comprise: analyzing the code of the AI model; splitting it into three blocks; determining the processing resources required by input and output blocks using the corresponding portions of the code, comparing the required resources with the available resources in the first computer system, and if the available resources are not enough to execute the input block and/or output block, the dynamic splitting is repeated until the available resources are enough to execute the input block and/or output block. On the other hand, the static splitting can, for example, be performed by selecting the definition of the blocks from a lookup table sorted by minimum remaining on-device resource requirements. The lookup table can comprise entries such as entry: "category_1: <4 GB RAM, <1 GHz CPU Clock, <1 MB Cache" where the first field of the entry "category_1" provides a definition of the three blocks, and the remaining fields provide the resources suitable for these three blocks definition, such as a RAM smaller than 4 GB etc. This can provide a flexible implementation of the splitting step. The dynamic splitting can provide up-to-date structure of the blocks based on currently available resources. The static splitting can save processing resources that would otherwise be required to dynamically find the three model blocks in every iteration of AI model execution.

According to some examples, the execution of the AI model comprises execution of a succession of processing steps, where splitting the AI model is performed such that the input block is configured to perform a first number (N1) of first successive processing steps and the output block is configured to perform a third number (N3) of last successive processing steps, where the intermediate block is configured to perform a second number (N2) of successive processing steps that follow the first processing steps of the input block, and where the sum of the first number, second number and the third number is the total number of processing steps in the AI model. That is, N1+N2+N3 is the number of processing steps of the AI model. The execution stage of the model, which is defined beforehand, can comprise one or more processing steps of the model.

Furthermore, according to some examples, the first number N1 is smaller than the second number N2 by a first delta value, wherein the third number N3 is smaller than the second number N2 by a second delta value. For example, $N2-N1<\Delta 1$ and $N2-N3<\Delta 2$, where $\Delta 1$ is the first delta value and the $\Delta 2$ is the second delta value. The first delta value and second delta value are positive integers, $\Delta 1>0$ and $\Delta 2>0$. In one example, the first delta value and second delta value can be user defined values. This can enable systematic and equal processing of the AI model regardless of the available resources. This can particularly be advantageous in case the first computer system has enough resources to process the whole AI model locally.

The intermediate block can be referred to as the main block as it can comprise most of the processing steps of the AI model.

Moreover, according to some examples, the first number N1 and third number N3 can be determined based on available resources in the first computer system. Alternatively, instead of determining N1 and N3, the delta values $\Delta 1$ and $\Delta 2$ can be determined. The determination can, for example, be performed such that the numbers N1 and N3 are as high as possible given the available resources. For example, given a set of hardware specifications such as RAM, CPU Clock, Cache of the first computer system, and given a predicted usage of said specifications regarding the computational complexity of the AI model, the numbers N1 and N3 (or $\Delta 1$ and $\Delta 2$) can accurately be estimated. This can provide as high as possible the number of processing steps performed by the input and output blocks, where the higher the numbers N1 and N3 the more secure execution of the AI model is. This is because the processing is done locally and the output of the input block can be unpredictable.

According to some examples, the first encoding protocol that is used to encode and decode the first intermediate output can be the same as the second encoding protocol that is used to encode and decode the second intermediate output. This can be advantageous as it can provide a uniform processing and communication of data between the first and second computer systems while still securing and/or reducing the communicated data.

According to some examples, the first encoding protocol that is used to encode and decode the first intermediate output can be different from the second encoding protocol that is used to encode and decode the second intermediate output. This can further strengthen the secure aspect of the present method, because the more encoding methods used the less the chance to have access to encoded data.

According to some examples, the encoding of data in accordance with the first encoding protocol can be selected from the group consisting of compression and encryption. The encoding of data in accordance with the second encoding protocol can be selected from the group consisting of compression and encryption. This can enable secure communication of data and reduce the network usage.

According to some examples, the AI model is a trained model. In this case the execution of the AI model using the present methods is an inference of the AI model.

According to some examples, the AI model is not yet trained and the method as described can execute one training iteration of the training. In this case, the method can be repeated for each further received input in order to train the AI model. In this case, the first computer system can be further configured to compute a loss function based on the output of the output block and to send back the result of computation to the second computer system. The result can be used by the first and second computer systems to adapt the respective learnable parameters of the AI model before executing it again. The repetition can be performed until the loss function fulfills convergence criterion. This example can enable a secure and efficient training of the AI model.

According to some examples, the first computer system has an amount of processing resources which is smaller than the processing resources of the second computer system. The second computer system can be any computer system that has processing resources for executing any defined intermediate block of the AI model. For example, the second computer system can be any computer system that has processing resources for executing the whole AI model.

According to some examples, the second computer system is provided as a service in a cloud computing environment. In one example, the second computer system can be provided as a cloud instance in the cloud computing environment. The cloud instance can be a server resource provided by cloud services. In one example, the second computer system can be implemented using one or more functional abstraction layers provided by the cloud computing environment (e.g., the hardware and software resources of the second computer system can be provided by the hardware and software layer of the cloud computing environment). The workload layer of the cloud computing environment can, for example, be used to implement the steps to be executed by the second computer system. The cloud computing environment can remain unaware of any data and output labels as it does not possess the complete AI model and external model inversion, and/or reverse-engineering attacks can be mitigated by the secure model encoding, thus preserving data. The inference can thus take place exclusively and securely at the edge device, making use of the cloud environment as a pure computing and processing instance without knowledge about the particular use case and inference outcomes of the edge device.

According to some examples, the AI model is a foundation model. The foundation model can be a large AI model trained on a vast quantity of data at scale resulting in a model that can be adapted to a wide range of downstream tasks. Examples of foundation models include Bidirectional Encoder Representations from Transformers (BERT) and Generative Pre-trained Transformer n series (GPT-n series). The first and last foundation model (FM) layers are processed on-device and their intermediate cut-layer activations are securely transmitted (received) by applying compression (decompression) while guaranteeing communication efficient low-bandwidth transmissions.

According to some examples, the AI model is a deep neural network, where the input block represents first network layers, the intermediate block represents middle network layers; and the output block represents last network layers. Following this example, each processing step of the AI model can represent the processing performed for a respective layer of the deep neural network. That is, the input block comprises N1 first layers of the deep neural network, the intermediate block comprises N2 layers of the deep neural network and the output block comprises N3 last layers of the deep neural network, where the total number of layers in the deep neural network is N1+N2+N3.

According to some examples, the first computer system is any one of an edge device, a user equipment (UE), or an internet of things (IoT) device. This example can be seamlessly integrated in wireless or mobile communication systems. The mobile communication system provides wireless connectivity to users. The users can, for example, comprise mobile devices, tablets, laptops, or individuals. The mobile communication system can comprise a radio access network (RAN) and a core network. The core network can provide Internet Protocol (IP) connectivity to the radio access network. The radio access network can manage the radio spectrum of users using radio devices, such as base stations. The radio access network can enable to process packets in accordance with a processing pipeline. The processing pipeline has different layers. The layers include baseband processing layers and radio frequency (RF) processing layers. The baseband processing layers can be defined in accordance with a protocol stack and can be performed by a baseband unit, where the baseband unit is comprised in the edge device.

The baseband unit can be associated with one or more base stations. For example, each base station of the one or more base stations can serve users located within the base station's geographical area of service or a cell. The baseband unit can process baseband signals for served users of the one or more base stations. Thus, the baseband unit is said to be serving said users. The baseband unit can implement the layers of the protocol stack such as the Packet Data Convergence Protocol (PDCP) layer, Radio Link Control (RLC) layer, Medium Access Control (MAC) layer and Physical (PHY) layer. In some examples, the baseband unit can be divided into function entities each being configured to perform a respective function (e.g., a function can implement one or more layers of the stack protocol). For example, the baseband unit can be divided into two function entities named Centralized Unit (CU) and Distributed Unit (DU). The CU can provide support for the higher layers of the protocol stack such as the PDCP layer while the DU provides support for the lower layers of the protocol stack such as the RLC, MAC, and Physical layers.

The implementation of the baseband unit can be realized with a specific hardware and software configuration of the edge device. The software configuration of the baseband unit can comprise an operating system and software modules for performing the functions of the baseband unit. In addition, the software configuration can indicate one or more vendors that provide the software configuration. For example, the operating system and software modules can be provided by one or more vendors. The hardware configuration can comprise storage resources, data communication resources, and processing resources. In addition, the hardware configuration can indicate one or more vendors that provide the hardware configuration. The resources can be provided by one or more vendors.

FIG. 1 depicts a diagram of a wireless communication system in accordance with an example of the present disclosure. The wireless communication system 100 comprises a core network 101 and a radio access network 102. The radio access network 102 can comprise a remote radio component 107 equipped by, but not limited to, base stations 109 and 111. Each base station 109 or 111 can comprise a remote radio unit (RRU) with antennas any can serve UEs 120 in respective cells 121 and 122. The radio access network 102 can further comprise a first computer system 103. The first computer system can, for example, comprise a baseband processing component including a set of baseband units (BBUs) 105.1-*n*. The baseband unit can be connected to a respective RRU in the remote radio component 107 through a fiber or cable 113. The first computer system 103 can be configured to connect to the core network 101 via a backhaul link 115. The baseband processing component can comprise a central unit 117 which is configured to control the operation and deployment of the baseband units 105.1-*n*.

The remote radio component 107 can be configured to connect to a cloud computing environment 130. For example, each base station of the remote radio component 107 can be configured to connect to the cloud computing environment 130. The cloud computing environment 130 can comprise a second computer system 131. In one example, the second computer system 131 can be provided as a cloud instance in the cloud computing environment 130.

Figure 9:
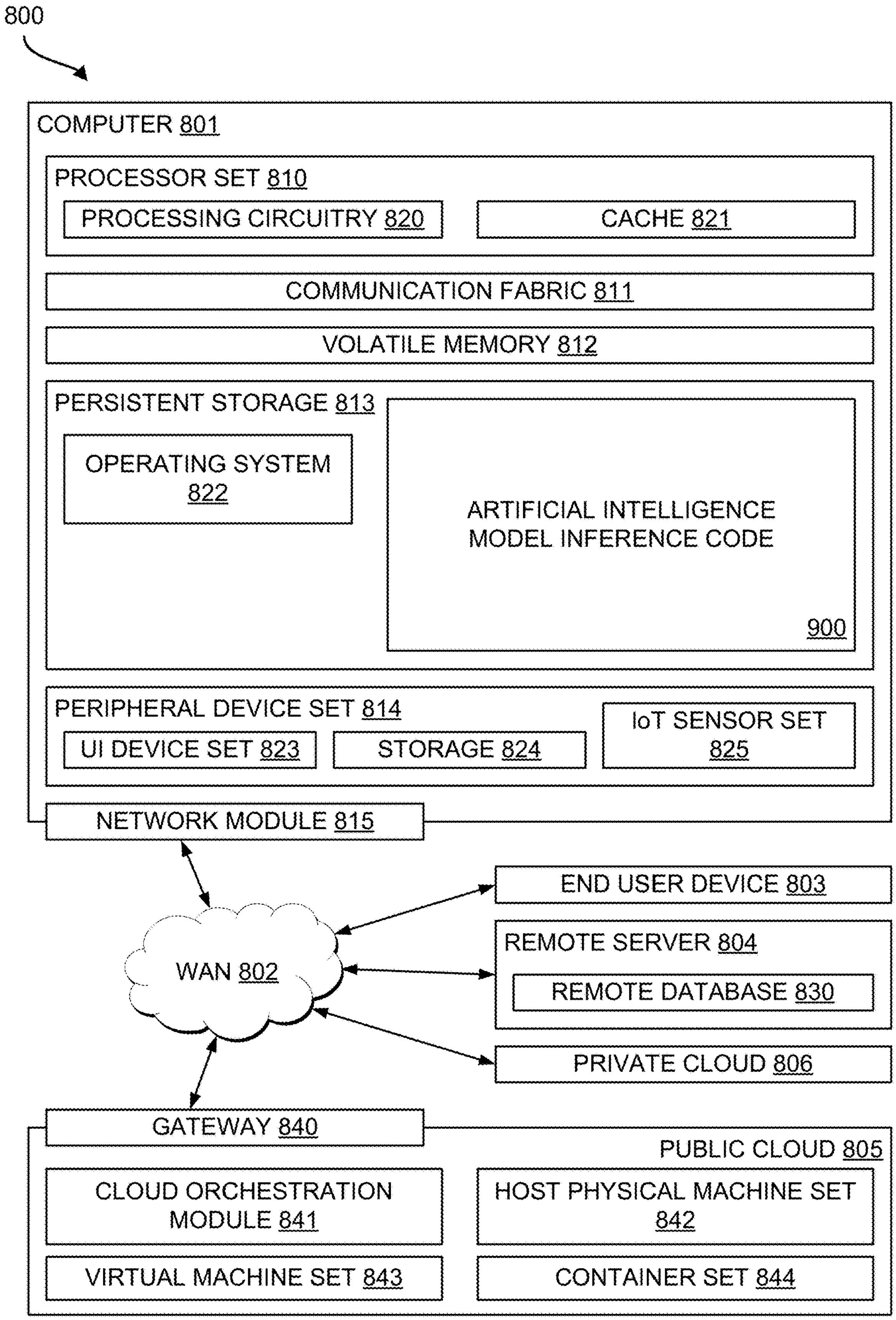
FIG. 9 is a computing environment in accordance with an example of the present disclosure.

In some example implementations, the cloud computing environment 130 can, for example, be provided as described with reference to FIG. 9. For example, the second computer system 131 can be implemented using one or more functional abstraction layers provided by the cloud computing environment 130 (e.g., the hardware and software resources of the second computer system 131 can be provided by the hardware and software layer of the cloud computing environment 130). The workload layer of the cloud computing environment 130 can, for example, be used to implement the method of FIG. 4 to be executed by the second computer system 131.

In one example implementation, the system 100 can be provided as an Open Radio Access Network (O-RAN), where the first computer system 103 can be in one or more edge sites and the remote radio component 107 can be in one or more cell sites.

Figure 2:
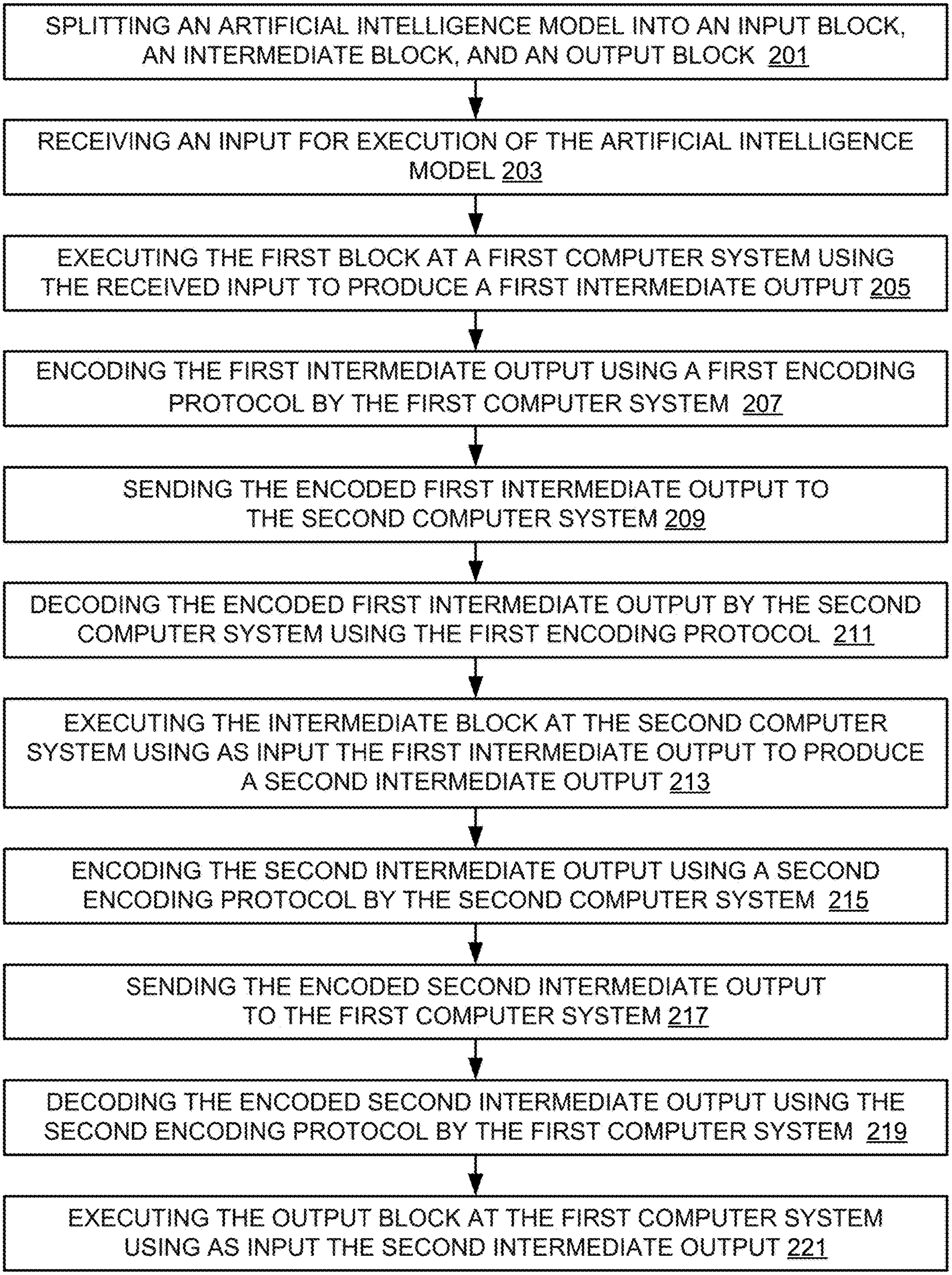
FIG. 2 is a flowchart of a method for executing an artificial intelligence model in accordance with an example of the present disclosure.

FIG. 2 is a flowchart of a method for executing an AI model in accordance with an example of the present disclosure. For the purpose of explanation, the method of FIG. 2 can be implemented in the system of FIG. 1, but it is not limited to the system of FIG. 1. The method can, for example, be performed by the first computer system 103 and the second computer system 131.

The method of FIG. 2 can be performed using an AI model. The method can, for example, be performed in response to receiving the AI model (e.g., an AI package containing the code and metadata for executing the AI model). Alternatively, the AI model can exist in the first computer system or in a management server that manages operation of the first computer system (e.g., and the second computer system). In this case, the method can be performed upon receiving a request to execute the AI model.

The AI model is configured to receive an input (e.g., input X), process the input and provide an output (e.g., output Y, where the output Y represents the task result of processing the input X).

The AI model can be split in step 201 into an input block, an intermediate block, and an output block, such that the input block receives the input X and provides an intermediate output, the intermediate block receives as input the intermediate output and provides another intermediate output, and the output block receives as input the other intermediate output and provides the output Y. That is, the AI model after being split would provide for the input X the same output Y as if it was not split. For example, the first computer system can comprise the input block and the output block and the second computer system can comprise the intermediate block.

After splitting the AI model, an input for execution of the AI model can be received in step 203. The input block can be executed in step 205 in the first computer system using the received input. This can result in a first intermediate output. The first computer system can encode in step 207 using a first encoding protocol the first intermediate output to produce an encoded first intermediate output. The first computer system can send in step 209 the encoded first intermediate output to the second computer system.

In response to receiving the encoded first intermediate output, the second computer system can decode (e.g., automatically) in step 211 the encoded first intermediate output using the first encoding protocol. The second computer system can execute in step 213 the intermediate block using as input the first intermediate output. This can result in a second intermediate output.

The second computer system can encode in step 215 the second intermediate output using a second encoding protocol to produce an encoded second intermediate output. The second computer system can send in step 217 the encoded second intermediate output to the first computer system.

In response to receiving the encoded second intermediate output, the first computer system can decode in step 219 using the second encoding protocol the encoded second intermediate output. The first computer system can execute in step 221 the output block using as input the second intermediate output. This can produce an output that can represent a result of the task performed by the AI model.

In one example implementation of the method of FIG. 2, the method can be an inference method for inferring the AI model which is already trained. In this case, the method steps 203 to 221 can, for example, be repeated for performing further inferences for further received inputs respectively.

In one example implementation of the method of FIG. 2, the method can be used for training the AI model. In this case, the method steps 203 to 221 can, for example, be repeated for further received inputs of a training dataset. The repetition can be performed until a loss function converges, wherein the loss function can be evaluated by the first computer system using the result output. In this case, after each iteration, the set of learnable parameters can be updated in the respective first and second computer systems based on the evaluated loss function (e.g., the loss function result can be sent by the first computer system to the second computer system so that the second computer system can update the subset of learnable parameters which are associated with the intermediate block).

In one alternative implementation, the splitting step 201 can be performed by the management server. The blocks can, for example, be deployed by the management server in the two computer systems or can be deployed by a user of the AI model in the two computer systems. Additionally, the management server can control execution of the method steps by the first and second computer systems.

Figure 3:
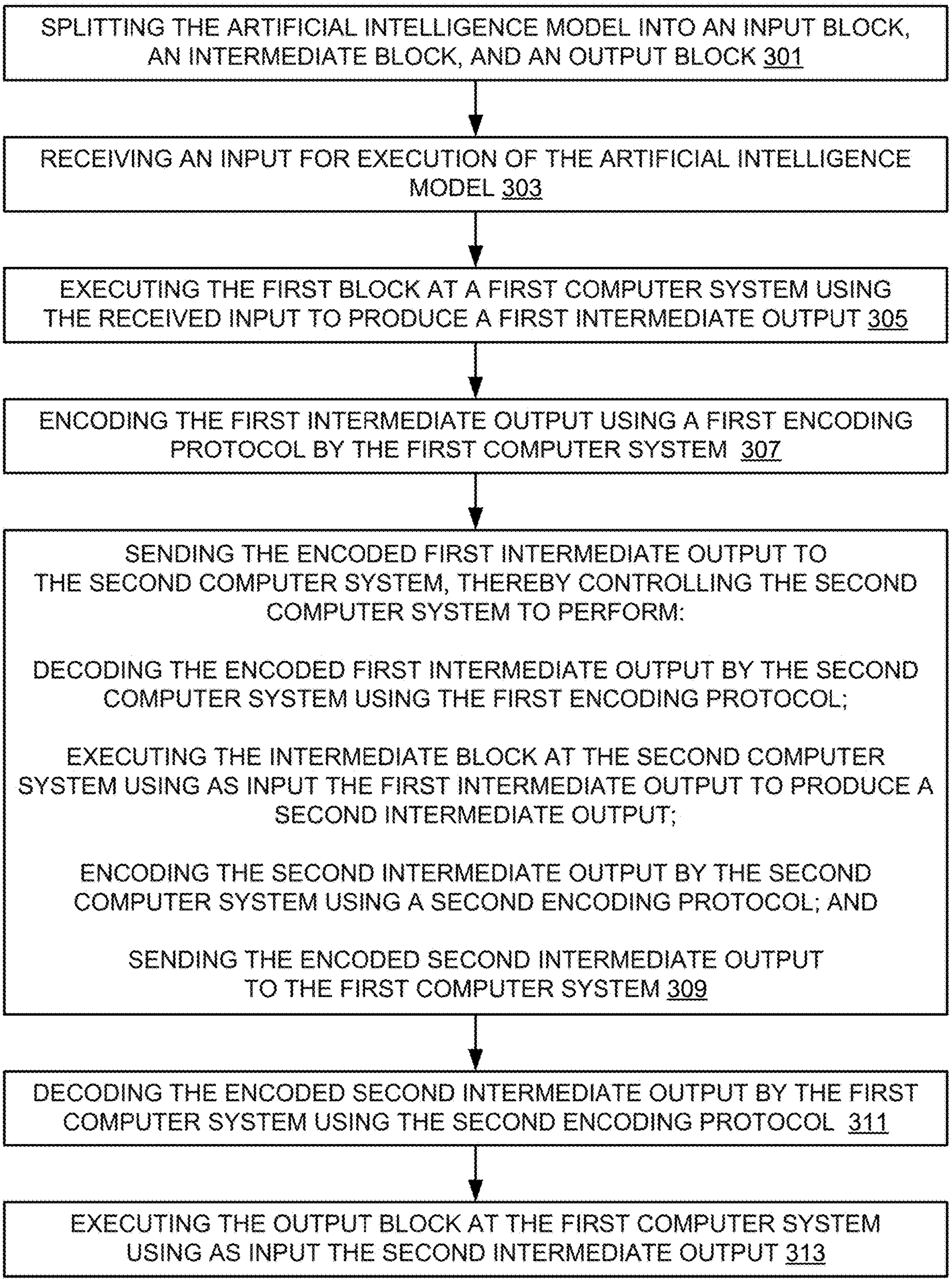
FIG. 3 is a flowchart of a method for executing an artificial intelligence model in accordance with an example of the present disclosure.

FIG. 3 is a flowchart of a method for executing an AI model in accordance with an example of the present disclosure. For the purpose of explanation, the method of FIG. 3 can be implemented in the system of FIG. 1, but it is not limited to the system of FIG. 1. The method can, for example, be performed by the first computer system 103.

The method of FIG. 3 can be performed using an AI model. The method can, for example, be performed in response to receiving the AI model. Alternatively, the AI model can exist in the first computer system or in a management server that manages operation of the first computer system. In this case, the method can be performed upon receiving a request to execute the AI model.

The AI model is configured to receive an input (e.g., X), process the input and provide an output (e.g., output Y, where the output Y represents the result of processing the input X).

The AI model can be split in step 301 into an input block, an intermediate block, and an output block, such that the input block receives the input X and provides an intermediate output, the intermediate block receives as input the intermediate output and provides another intermediate output, and the output block receives as input the other intermediate output and provides the output Y. That is, the AI model after being split would provide for the input X the same output Y as if it was not split. For example, the first computer system can comprise the input block and the output block and the second computer system can comprise the intermediate block. The blocks can, for example, be deployed by the manager in the two computer systems or can be deployed by a user of the AI model in the two computer systems.

After splitting the AI model, an input for execution of the AI model can be received in step 303. The input block can be executed in step 305 in the first computer system using the received input. This can result in a first intermediate output. The first computer system can encode in step 307 using a first encoding protocol the first intermediate output.

The first computer system can send in step 309 the encoded first intermediate output to the second computer system. The reception of the encoded first intermediate output at the second computer system can trigger the second computer system to perform the following steps s1 to s4. Alternatively, the first computer system can send with the encoded first intermediate output a command or instruction that controls the second computer system to perform steps s1 to s4. In response to receiving the encoded first intermediate output, the second computer system can decode (e.g., automatically) in step s1 the encoded first intermediate output using the first encoding protocol. The second computer system can execute in step s2 the intermediate block using as input the first intermediate output. This can result in a second intermediate output. The second computer system can encode in step s3 the second intermediate output using a second encoding protocol. The second computer system can send in step s4 the encoded second intermediate output to the first computer system.

In response to receiving the encoded second intermediate output, the first computer system can decode in step 311 using the second encoding protocol the encoded second intermediate output. The first computer system can execute in step 313 the output block using as input the second intermediate output. This can result in an output that can represent a result of the task performed by the AI model.

In one example implementation of the method of FIG. 3, the method can be an inference method for inferring the AI model which is already trained. In this case, the method steps 303 to 313 can, for example, be repeated for performing further inferences for further received inputs respectively.

In one example implementation of the method of FIG. 3, the method can be used for training the AI model. In this case, the method steps 303 to 313 can, for example, be repeated for further received inputs of a training dataset. The repetition can be performed until a loss function converges, where the loss function can be evaluated by the first computer system using the result output. In this case, after each iteration, the set of learnable parameters can be updated in the respective first and second computer systems based on the evaluated loss function. For example, the loss function result can be sent by the first computer system to the second computer system so that the second computer system can update the subset of learnable parameters which are associated with the intermediate block.

Figure 4:
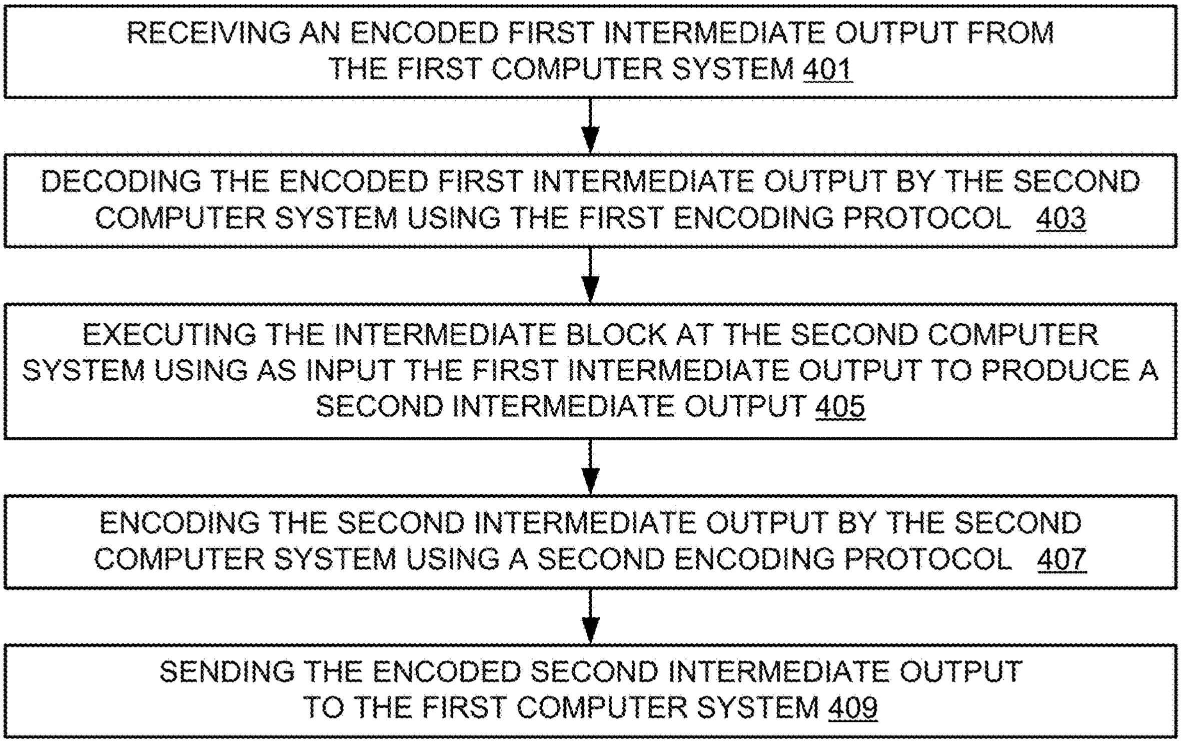
FIG. 4 is a flowchart of a method for executing an artificial intelligence model in accordance with an example of the present disclosure.

FIG. 4 is a flowchart of a method for executing an AI model in accordance with an example of the present disclosure. For the purpose of explanation, the method of FIG. 4 can be implemented in the system of FIG. 1, but it is not limited to the system of FIG. 1. The method can, for example, be performed by the second computer system 131.

The second computer system 131 can receive encoded first intermediate output from the first computer system in step 401. In response to receiving the encoded first intermediate output, the second computer system can decode (e.g., automatically) in step 403 the encoded first intermediate output using the first encoding protocol. The second computer system can execute in step 405 the intermediate block using as input the first intermediate output. This can result in a second intermediate output. The second computer system can encode in step 407 the second intermediate output using a second encoding protocol. The second computer system can send in step 409 the encoded second intermediate output to the first computer system.

Figure 5:
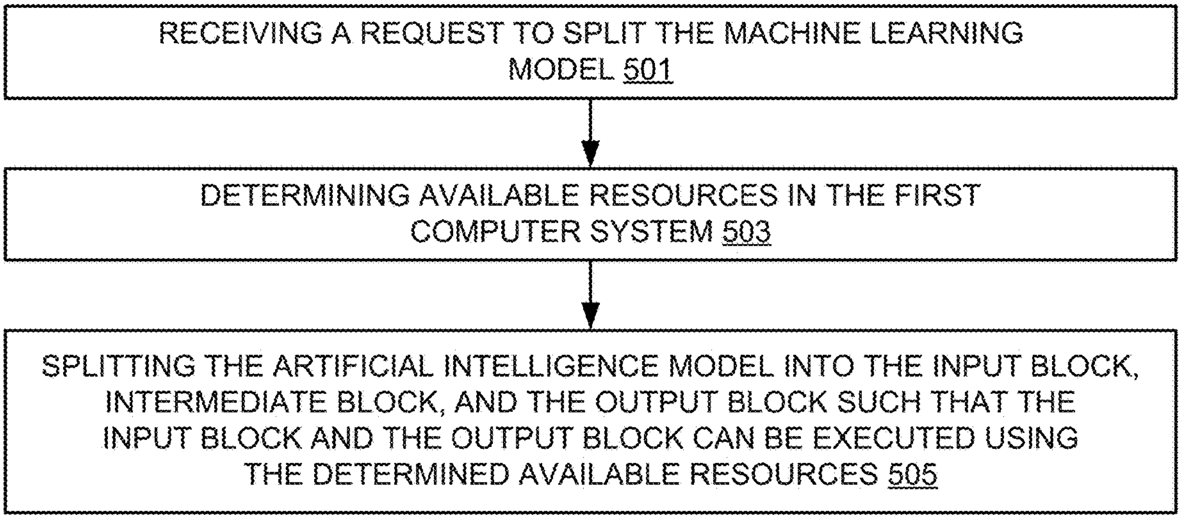
FIG. 5 is a flowchart of a method for splitting an artificial intelligence model in accordance with an example of the present disclosure.

FIG. 5 is a flowchart of a method for splitting an AI model in accordance with an example of the present disclosure. For the purpose of explanation, the method of FIG. 5 can be implemented in the system of FIG. 1, but it is not limited to the system of FIG. 1. The method can, for example, be performed by the first computer system 103 or by a management server that is configured to connect to the first computer system 103 and the second computer system 131.

A request to split the AI model can be received in step 501. Resources available in the first computer system 103 can be determined in step 503. The AI model can be split in step 505 into input block, intermediate block (e.g., main block), and output block based on the determined available resources. For example, the splitting can be performed such that the input block and output block can be executed using the available resources.

Figure 6:
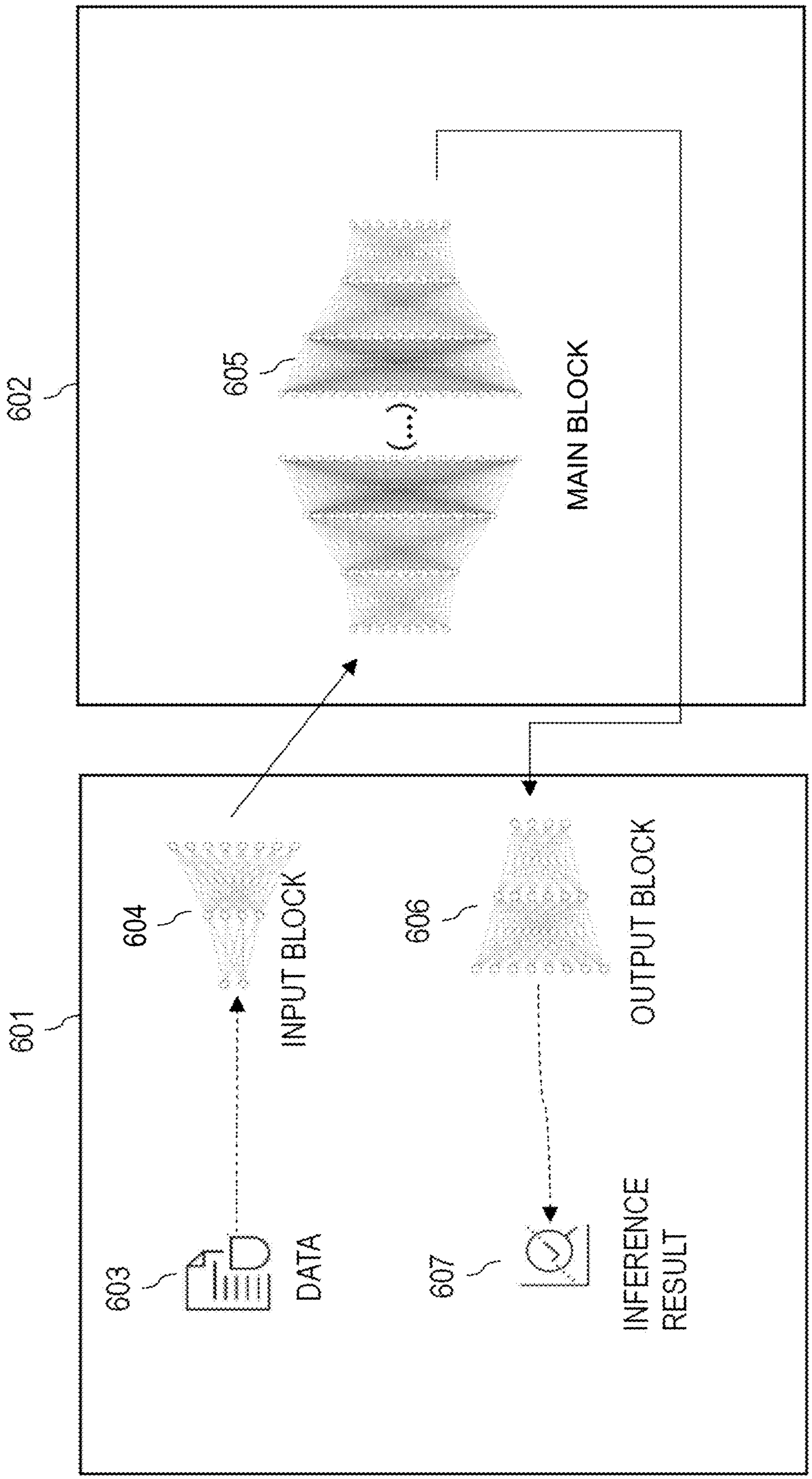
FIG. 6 is a diagram illustrating the AI model splitting in accordance with an example of the present disclosure.

FIG. 6 is a diagram illustrating a method for splitting a Foundation Model. The Foundation Model can be split into three blocks (e.g., as described with reference to FIG. 5). As shown, a first computer system 601 can comprise the input block 604 and the output block 606 while a remote second computer system 602 comprises the main block 605. The input data 603 can be received at the first computer system 601 and processed by the input block 604. The output of the input block 604 can be processed by the main block 605 in the second computer system 602. In turn, the output of the main block 605 can be processed by the output block 606 in order to obtain an inference result 607 of the input data 603.

Figure 7:
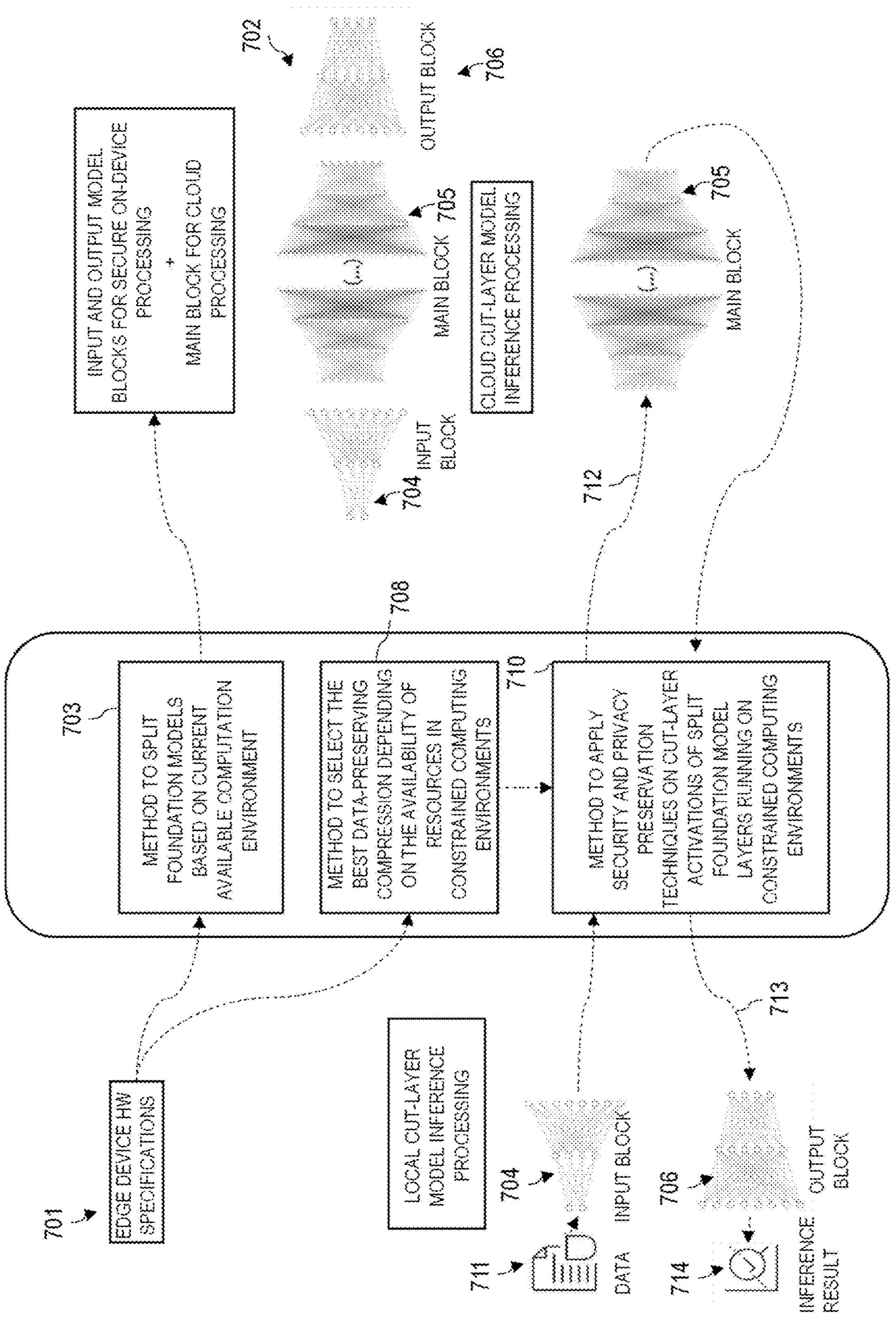
FIG. 7 is a flowchart of a method for executing an artificial intelligence model in accordance with an example of the present disclosure.

FIG. 7 is a flowchart of a method for executing an AI model 702 in accordance with an example of the present disclosure. For the purpose of explanation, the method of FIG. 7 can be implemented in the system of FIG. 1, but it is not limited to the system of FIG. 1. The method can, for example, be performed by an edge device and a cloud system. The AI model 702 can, for example, be a Foundation Model.

The hardware specifications 701 of the edge device can be used as input to steps 703 and 708. In step 703, a method to split Foundation Models based on current available computation environment can be executed. For example, given information about available edge device computing resources and subsequent processing methods, the best Foundation Model split is determined resulting in dedicated input and output processing blocks for the edge device and a main processing block for the cloud instance. This step 703 can result in three blocks of the AI model 702, namely an input block 704, a main block 705 and an output block 706.

The method of step 703 can, for example, be performed as follows. Given a set of edge device HW specifications such as RAM, CPU Clock and Cache, given the predicted usage of said specifications regarding the computational complexity of the model, and given a minimum predicted or hard-set usage of said specifications reserved for data security preserving compression, then, the remaining available HW resources are estimated and the input and output blocks are determined based on these metrics by a management server either a) dynamically, where individual input/output blocks are designed based on their computational complexity in accordance with the available resources on the device, or b) statically, where the input/output blocks are chosen from a lookup table sorted by minimum remaining on-device resource requirements (e.g. category_1: <4 GB RAM, <1 GHz CPU Clock, <1 MB Cache, category_2: . . . ). The management server distributes the input, main and output blocks to the edge device and cloud instance, respectively, while ensuring that the edge device can only possess either the input or output block at each time instance to ensure maximum utilization of HW resources (e.g., the input block configuration is deleted after processing, compression and transmission to free up computational power for the output block which is then downloaded from the management server).

In step 708, a method to select the best data-preserving compression depending on the availability of resources in constrained computing environments can be executed. For example, given information about available algorithms for data-preserving compression/decompression, information about the constrained computing environment, and parameters of the required security levels, the best algorithm to apply at the moment is selected.

The method of step 708 can, for example, be performed as follows. Features A) to D) can be provided. A) a set of available online and offline algorithms for data-preserving compression/decompression of the split foundation model associated to expected computing performance metrics, B) a set of rules that map the consumption of energy and computing resources by these algorithms running on the existing computing environment, and C) a set of parameters about resource availability on the current computing environment, D) the desired trade-off between security and compression. Given A), B), C), and D) then, the best data-preserving compression/decompression algorithm is chosen according to the device-specific HW and/or network requirements as well as rule-based decisions.

In step 710, a method to apply security and data preservation techniques on cut-layer activations of split Foundation Model layers running on constrained computing environments can be executed. As indicated in FIG. 7, the execution of the method of step 710 can comprise the processing of input data 711 by the input block 704. This can result in the first intermediate result 712 which is encoded and sent to the cloud system that decodes it such that the main block 705 processes the first intermediate result 712 and provides second intermediate output 713, which is encoded and sent to the edge device that decodes it, such that the output block 706 processes the second intermediate output 713 and provides the inference results 714.

The method of step 710 can thus process the data-preserving compression upon the intermediate cut-layer activations that may need to be shared between edge device and cloud. It can further process the input and output blocks on-device and outsource the intensive computations of the large Foundation Model to the Cloud instance.

Figure 8:
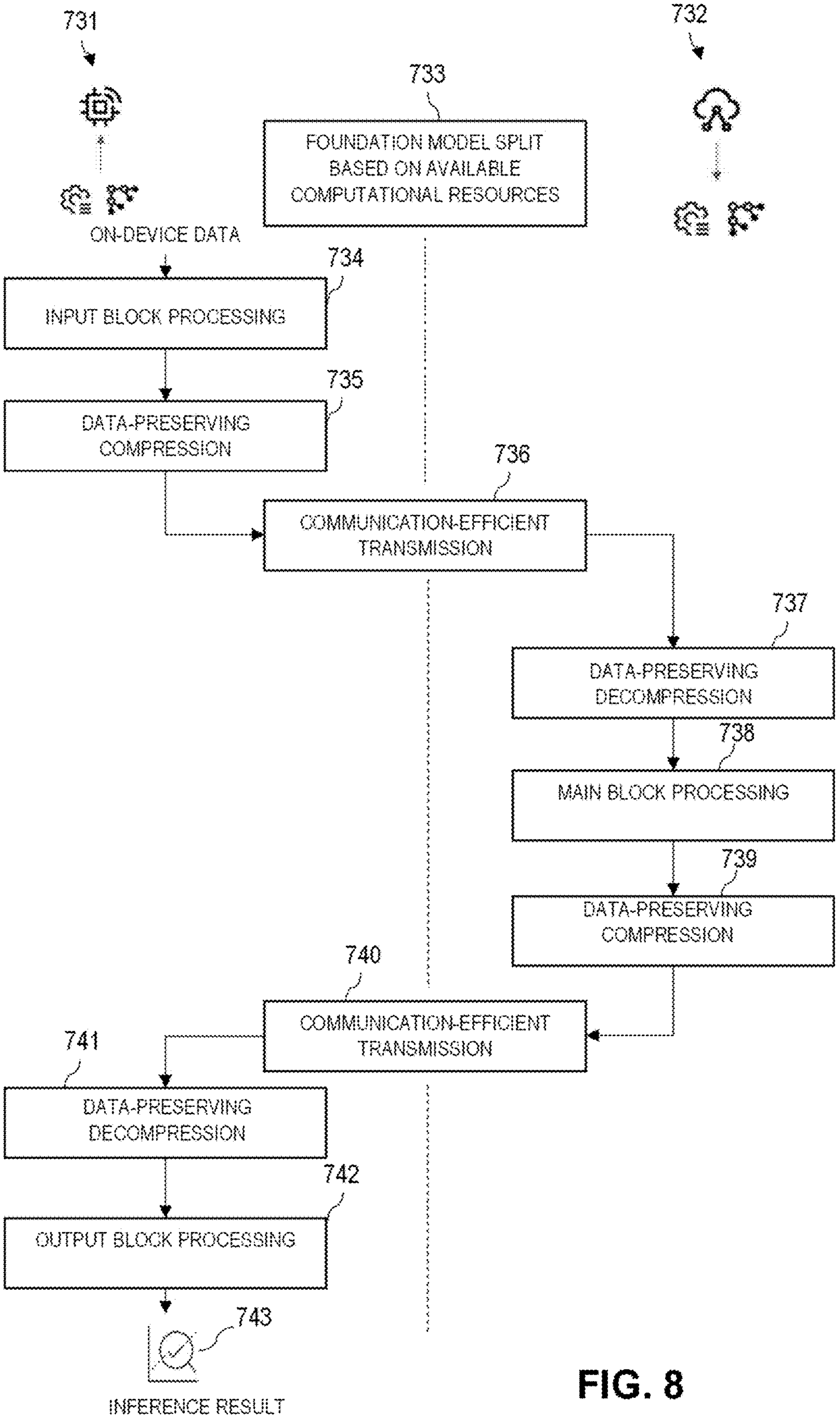
FIG. 8 is a flowchart of a method for executing an artificial intelligence model in accordance with an example of the present disclosure.

FIG. 8 is a flowchart of a method for executing an AI model in accordance with an example of the present disclosure. For the purpose of explanation, the method of FIG. 8 can be implemented in the system of FIG. 1, but it is not limited to the system of FIG. 1. The method can, for example, be performed by an edge device 731 and a cloud system 732. The AI model can, for example, be a Foundation Model.

A split of the Foundation Model can be performed in step 733 based on available computational resources in the edge device 731. This can result in the input block, main block, and the output block (e.g., as shown with reference to FIG. 7). Some on-device data of the edge device 731 can be processed by the input block in step 734 at the edge device 731. This can result in first intermediate output. A data-preserving compression can be performed by the edge device 731 in step 735 on the first intermediate output. This can result in compressed first intermediate output. The compressed first intermediate output is transmitted by the edge device 731 to the cloud system 732 in step 736. A data-preserving decompression can be performed by the cloud system 732 in step 737 on the compressed first intermediate output. The first intermediate output can be processed by the main block in step 738 at the cloud system 732. This can result in second intermediate output. The data-preserving compression can be performed by the cloud system 732 in step 739 on the second intermediate output. This can result in compressed second intermediate output. The compressed second intermediate output is transmitted by the cloud system 732 to the edge device 731 in step 740. The data-preserving decompression can be performed by the edge device 731 in step 741 on the compressed second intermediate output. The second intermediate output can be processed by the output block in step 742 at the edge device 731. This can result in inference result 743.

Computing environment 800 contains an example of an environment for the execution of at least some of the computer code involved in performing the inventive methods, such as AI model inference code 900. In addition to AI model inference code 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric

811, volatile memory 812, persistent storage 813 (including operating system 822 and AI model inference code 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method can be distributed among multiple computers and/or between multiple locations. On the other hand, in this presentation of computing environment 800, detailed discussion is focused on a single computer, specifically computer 801, to keep the presentation as simple as possible. Computer 801 can be located in a cloud, even though it is not shown in a cloud in FIG. 9. On the other hand, computer 801 is not required to be in a cloud except to any extent as can be affirmatively indicated.

PROCESSOR SET 810 includes one, or more, computer processors of any type now known or to be developed in the future. Processing circuitry 820 can be distributed over multiple packages, for example, multiple, coordinated integrated circuit chips. Processing circuitry 820 can implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set can be located "off chip." In some computing environments, processor set 810 can be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer-readable storage media, such as cache 821 and the other storage media discussed below. The program instructions, and associated data, are accessed by processor set 810 to control and direct performance of the inventive methods. In computing environment 800, at least some of the instructions for performing the inventive methods can be stored in AI model inference code 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory can be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 can be a read only memory (ROM), but typically at least a portion of the persistent storage allows writing of data, deletion of data and re-writing of data. Some familiar forms of persistent storage include magnetic disks and solid state storage devices. Operating system 822 can take several forms, such as various known proprietary operating systems or open source Portable Operating System Interface-type operating systems that employ a kernel. The code included in AI model inference code 900 typically includes at least some of the computer code involved in performing the inventive methods.

PERIPHERAL DEVICE SET 814 includes the set of peripheral devices of computer 801. Data communication connections between the peripheral devices and the other components of computer 801 can be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 can include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 can be persistent and/or volatile. In some embodiments, storage 824 can take the form of a quantum computing storage device for storing data in the form of qubits. In embodiments where computer 801 is required to have a large amount of storage (for example, where computer 801 locally stores and manages a large database) then this storage can be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor can be a thermometer and another sensor can be a motion detector.

NETWORK MODULE 815 is the collection of computer software, hardware, and firmware that allows computer 801 to communicate with other computers through WAN 802. Network module 815 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and can take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way. EUD 803 can display, or otherwise present, the recommendation to an end user. In some embodiments, EUD 803 can be a client device, such as thin client, heavy client, mainframe computer, desktop computer and so on.

REMOTE SERVER 804 is any computer system that serves at least some data and/or functionality to computer 801. Remote server 804 can be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data can be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs can be stored as images and can be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

The invention claimed is:

1. A computer-implemented method for executing an artificial intelligence model, comprising:

receiving an input for execution of the artificial intelligence model, wherein the artificial intelligence model is split into an input block, an intermediate block, and an output block, such that the input block receives specific input and provides an intermediate output, the intermediate block receives as input the intermediate output and provides another intermediate output, and the output block receives as input the another intermediate output and provides specific output;

executing the input block by a first computer system using the input, producing a first intermediate output;

encoding by the first computer system the first intermediate output using a first encoding protocol to produce an encoded first intermediate output;

sending the encoded first intermediate output to a second computer system to allow the second computer system to:

decode the encoded first intermediate output using the first encoding protocol, and execute the intermediate block using as input the first intermediate output to produce a second intermediate output, encode the second intermediate output using a second encoding protocol to produce an encoded second intermediate output, and send the encoded second intermediate output to the first computer system; and in response to receiving the encoded second intermediate output, decoding by the first computer system the encoded second intermediate output using the second encoding protocol, and executing the output block at the first computer system using as input the second intermediate output, producing a result output of a task performed by the artificial intelligence model as a whole by way of the input block, intermediate block, and output block.

2. The computer-implemented method of claim 1, further comprising: before executing the output block, deleting the input block from the first computer system.

3. The computer-implemented method of claim 1, further comprising: after executing the input block, deploying the output block into the first computer system.

4. The computer-implemented method of claim 1, wherein the splitting of the artificial intelligence model is performed based on available resources in the first computer system.

5. The computer-implemented method of claim 4, wherein the splitting of the artificial intelligence model is dynamically performed or performed using one of predefined splitting options which are associated with a respective amount of resources.

6. The computer-implemented method of claim 1, wherein the execution of the artificial intelligence model comprises execution of a succession of processing steps, wherein splitting the artificial intelligence model is performed such that the input block is configured to perform a first number of successive processing steps, the intermediate block is configured to perform a second number of successive processing steps that follow the first number of successive processing steps of the input block, and the output block is configured to perform a third number of last successive processing steps, wherein a sum of the first number of successive processing steps, the second number of successive processing steps, and the third number of last successive processing steps is a total number of processing steps in the artificial intelligence model.

7. The computer-implemented method of claim 6, wherein the first number of successive processing steps is smaller than the second number of successive processing steps by a first delta value, wherein the third number of last successive processing steps is smaller than the second number of successive processing steps by a second delta value.

8. The computer-implemented method of claim 7, further comprising determining the first and second delta values based on available resources in the first computer system.

9. The computer-implemented method of claim 1, wherein the first encoding protocol is the second encoding protocol.

10. The computer-implemented method of claim 1, wherein the first encoding protocol is different from the second encoding protocol.

11. The computer-implemented method of claim 1, wherein the first encoding protocol is selected from a group consisting of compression and encryption, and wherein the second encoding protocol is selected from a group consisting of compression and encryption.

12. The computer-implemented method of claim 1, wherein the execution of the artificial intelligence model is an inference of the artificial intelligence model which is already trained.

13. The computer-implemented method of claim 1, further comprising, for each further received input, training the artificial intelligence model, wherein the first computer system is further configured to compute in each iteration a loss function and to send a result to the second computer system, wherein the result is used by the first and second computer systems to update learnable parameters of the artificial intelligence model, wherein an iteration is performed until the loss function fulfils a convergence criterion.

14. The computer-implemented method of claim 1, wherein the first computer system has an amount of processing resources which is smaller than the processing resources of the second computer system.

15. The computer-implemented method of claim 1, wherein the first computer system is selected from a group consisting of an edge device and an internet of things (IoT) device.

16. The computer-implemented method of claim 1, wherein the second computer system is provided as a service in a cloud environment.

17. The computer-implemented method of claim 1, wherein the artificial intelligence model is a foundation model, and wherein the artificial intelligence model is a deep neural network where the input block represents first network layers, the intermediate block represents middle network layers, and the output block represents last network layers.

18. The computer-implemented method of claim 1, further comprising splitting the artificial intelligence model by a management server, and deploying by the management server the input block, the output block, and the intermediate block in the first and second computer systems.

19. A computer program product comprising:

a non-transitory computer-readable storage media having computer-readable program code embodied therewith, the computer-readable program code configured to cause one or more processors to:

receive an input for execution of an artificial intelligence model, wherein the artificial intelligence model is split into an input block, an intermediate block, and an output block, such that the input block receives specific input and provides an intermediate output, the intermediate block receives as input the intermediate output and provides another intermediate output, and the output block receives as input the another intermediate output and provides specific output;

execute the input block by a first computer system using the input, producing a first intermediate output;

encode by the first computer system the first intermediate output using a first encoding protocol to produce an encoded first intermediate output;

send the encoded first intermediate output to a second computer system to allow the second computer system to:

decode the encoded first intermediate output using the first encoding protocol, and execute the intermediate block using as input the first intermediate output to produce a second intermediate output, encode the second intermediate output using a second encoding protocol to produce an encoded second intermediate output, and send the encoded second intermediate output to the first computer system; and in response to receiving the encoded second intermediate output, decode by the first computer system the encoded second intermediate output using the second encoding protocol, and execute the output block at the first computer system using as input the second intermediate output, producing a result output of a task performed by the artificial intelligence model as a whole by way of the input block, intermediate block, and output block.

20. A system for executing an artificial intelligence model, comprising: one or more computer readable storage media storing program instructions and one or more processors which, in response to executing the program instructions, are configured to:

receive an input for execution of the artificial intelligence model, wherein the artificial intelligence model is split into an input block, an intermediate block, and an output block, such that the input block receives a specific input and provides an intermediate output, the intermediate block receives as input the intermediate output and provides another intermediate output, and the output block receives as input the another intermediate output and provides a specific output;

execute the input block using the input received for execution of the artificial intelligence model, producing a first intermediate output;

encode the first intermediate output using a first encoding protocol to produce an encoded first intermediate output;

send the encoded first intermediate output to a second computer system to allow the second computer system to perform at least:

decoding the encoded first intermediate output using the first encoding protocol;

executing the intermediate block as input the first intermediate output, resulting in a second intermediate output;

encoding the second intermediate output using a second encoding protocol to produce an encoded second intermediate output;

sending the encoded second intermediate output to the computer system; and in response to receiving the encoded second intermediate output, decode the encoded second intermediate output using the second encoding protocol, and execute the output block using as input the second intermediate output, producing a result output of a task performed by the artificial intelligence model as a whole by way of the input block, intermediate block, and output block.

* * * * *